United States Patent [19]

Koljonen

[11] Patent Number: 4,663,882
[45] Date of Patent: May 12, 1987

[54] AUTOMATIC POISON DISPENSER FOR RODENT DESTRUCTIVE ANIMALS AND POISON PREPARATION FOR USE THEREWITH

[75] Inventor: Kari Koljonen, Uppsala, Sweden
[73] Assignee: Björn Strid, Sollentuna, Sweden
[21] Appl. No.: 711,514
[22] PCT Filed: Jul. 5, 1984
[86] PCT No.: PCT/SE84/00253
  § 371 Date: Mar. 5, 1985
  § 102(e) Date: Mar. 5, 1985
[87] PCT Pub. No.: WO85/00272
  PCT Pub. Date: Jan. 31, 1985

[30] Foreign Application Priority Data

Jul. 6, 1983 [SE] Sweden .............................. 8303864

[51] Int. Cl.[4] ........................................... A01M 25/00
[52] U.S. Cl. ........................................ 43/131; 424/410
[58] Field of Search ........................... 43/131; 424/17; 119/51 R

[56] References Cited

U.S. PATENT DOCUMENTS

| 382,048 | 5/1888 | Lindner | 119/51 R |
| 1,991,547 | 2/1935 | Deford | 43/131 |
| 2,690,029 | 9/1954 | Mullen | 43/131 |
| 2,725,665 | 12/1955 | Mullen | 43/131 |
| 2,912,788 | 2/1958 | Hargrove | 43/131 |
| 2,923,039 | 2/1960 | Imus | 43/131 |
| 2,962,219 | 11/1960 | Curran | 43/131 |
| 3,993,028 | 11/1976 | Baensch et al. | 43/131 |
| 4,375,732 | 3/1983 | Waast | 43/131 |
| 4,400,904 | 8/1983 | Baker | 43/131 |

FOREIGN PATENT DOCUMENTS

| 1566332 | 5/1969 | France . | |
| 2023987 | 1/1980 | United Kingdom . | |
| 2117242A | 10/1983 | United Kingdom | 43/131 |

Primary Examiner—Nicholas P. Godici
Assistant Examiner—Christopher L. McKee
Attorney, Agent, or Firm—Burns, Doane, Swecker & Mathis

[57] ABSTRACT

The automatic poison dispenser consists of a tubular element (5) intended for being mounted vertically at a wall (2), a pole or the like and containing stacked solid poison rods (13). At the lower part of the tubular element there are means (8) allowing an end portion (13') of the lowest poison rod (13) to be exposed for destructive animals at a certain distance from a floor (3). Screening means (9) prevent dogs, cats, etc. from getting access to the exposed end portion (13') of the poison rod. A poison preparation in the form of solid rods (13) contain poison but for an upper end portion (13"). To advantage the rods contain a mixture of poisoned so-called dry bait (typically about ⅔) and a stabilizing material or holder, preferably paraffin (typically about ⅓).

19 Claims, 3 Drawing Figures

4,663,882

AUTOMATIC POISON DISPENSER FOR RODENT DESTRUCTIVE ANIMALS AND POISON PREPARATION FOR USE THEREWITH

TECHNICAL FIELD

This invention relates to an automatic poison dispenser for rodent destructive animals, such as rats and mice, that is, an automatic dispenser which can be positioned in a place and filled with poison, the poison being accessible so as to be eaten by destructive animals in order to combat the latter. The invention also relates to a poison preparation that is suitable for use together with the automatic poison dispenser according to the invention.

BACKGROUND ART

Devices which are presently commonly used for positioning or presenting poison or means of combating against rats, mice and the like, commonly called rat poison, comprise a box (in most cases of wood, plastic or paper) wherein the rat poison is positioned in a loose form (poisoned so-called dry bait) and which is provided with entries through which rats, mice, etc. can enter and eat from the rat poison.

These devices have many drawbacks and limitations. They are rather clumsy and difficult to position in a protected way and in places where they will be of best use. Often they are run over, kicked off and knocked over, even by animals such as dogs, thereby involving the risk of demolition and the falling-out of rat poison. They are difficult to check with regard to the remaining amount of rat poison. The uncertainties associated with the use of these devices mean that it will not be possible to use the most efficient rat poisons which often are based upon components, fish-meal for instance, that are attractive to domestic animals such as dogs and cats, and which contain strongly poisonous substances.

OBJECT OF INVENTION

The object of the invention is to provide a new system for locating or positioning rat poison whereby the above-mentioned drawbacks and limitations will be removed and many advantages will be gained, such as:

(1) a rigid construction giving an entirely safe confinement of the poison preparation;
(2) enables the use of poison preparations having tempting or attractive ingredients and strongly poisonous substances, even of the type Category 1;
(3) a simple, adaptable design that needs very little space and may be placed almost anywhere, particularly in narrow and hidden places, such as in a wall corner etc.;
(4) enables a vertical positioning along a wall, a pole, a cable etc.;
(5) may be located in a stationary way and thereafter easily refilled with poison preparation as required;
(6) an entirely moisture-proof arrangement of the poison preparation, the latter therefor not being affected by a wet floor, etc.;
(7) can be locked easily and also used out-of-doors;
(8) can be checked easily with regard to remaining content of poison preparation, even at a certain distance;
(9) has a storing function, that is a long-term functioning, for what reason it need not be checked or refilled very often;
(10) uses a poison preparation in a solid form, facilitating the handling thereof;
(11) easy to store, to transport and to mount, generally speaking.

SUMMARY OF INVENTION

The above-mentioned object is obtained in accordance with the invention by means of an automatic poison dispenser, and a preparation to be used therewith, having the features defined in the appended claims.

Thus, the automatic poison dispenser according to the invention is essentially characterized in that it comprises an at least substantially closed straight tubular element containing a poison preparation in the form of one or more solid rods axially stacked one upon the other, the rods being designed so as to slide easily within the tubular element; in that the tubular element is arranged, at one end, to allow the insertion of said poison rods and, at the other end, to allow an end portion only of the poison rod located at said end to be at least partially exposed when the dispenser is in a position of use; in that the poison rods are arranged, when in a position of use, to be fed successively towards said other end of the tubular element and in that the tubular element, at said other end, is provided with screening means arranged to prevent larger animals, domestic animals, etc., from getting access to the exposed end portion of the poison rod, at least when the dispenser is in a position of use, but to allow rodent destructive animals to have access to the exposed end portion of the poison rod.

Preferably, the automatic poison dispenser is intended to have an essentially vertical position of use, whereby the poison rods will be fed vertically downwards towards the exposed position automatically due to the influence of gravitational forces. In this position, the exposed end portion of the lowest poison rod will be accessible so as to be eaten from below and/or from the side.

On one hand, the tubular configuration, in combination with a vertical mounting, means that the dispenser can be applied to a wall, a pole, a cable, a pile, etc., for example by means of surrounding clamps, so-called bundle bands, rubber bands, or the like, extremely easily. On the other hand, the dispenser will require very little room. Also, quite simply it can be positioned in a corner formed by two walls where it will be protected against external influence. At the same time, this often will be an advantageous location from a combat point of view.

Suitably, the automatic poison dispenser is positioned such that the exposed end portion of poison rod will be at a suitable distance from the base or floor, whereby any influence on the poison preparation due to possible moisture or water on the floor will be entirely avoided.

Thus, the tubular element at its lower end, can be provided with projecting stop means which, when the dispenser is in a position of use while in contact with a floor, for instance, cause the exposed poison rod end portion and the screening means to be in a predetermined suitable position relative to the floor.

Advantageously, said screening means are designed so as to give a required screening effect against greater animals, such as dogs and cats, by means of a co-action with adjoining portions of the floor and/or walls, whereby smaller openings will be defined through which the destructive animals only can enter or reach the exposed poison rod. In this connection, the screening means suitably can take the form of elements projecting from the lower part of the tubular element and having a shape similar to that of a screen roof or a visor.

These elements could be circumferential (the automatic poison dispenser then being positionable freely so that the destructive animals will have access from all sides), but preferably are provided in an asymmetric way such that they project substantially only at one side of the tubular element, namely the side opposite the side of the tubular element intended for application against a wall, a pole, a wire or cable, etc. in order to fasten the dispenser.

Instead of screen or baffle elements, preferably being unperforated and thus giving additional protection against water, rain or the like, said screening means can consist of separate rod elements, cage-like or basket-like configurations or the like, more or less surrounding the end of the tubular element and the associated exposed end portion of the poison rod in a suitable way.

Advantageously, at its last-mentioned end, the tubular element is provided with means connecting to the opening of the tubular element, said means merely allowing the end portion of a poison rod which is to be exposed, to project out of the opening of the tubular element. This means preferably are cage-like or basket-like, the exposed end portion of the poison rod then lying therein, outside of the opening of tubular element. However, other arrangements are also possible. For example, the end wall of the tubular element could be slotted or provided with holes in order to make it possible for the destructive animals to gnaw at the parts of the lowest poison rod end portion which are exposed beyond said slots or openings, some kind of stop means then being provided across the opening of the tubular element to prevent the poison rods from sliding out of the tubular element.

Said means for causing an end portion only of the lowest poison rod to be exposed can be arranged for co-action with said screening means in order to prevent dogs, cats, etc. from reaching the poison rod end portion for example by means of a labyrinth effect.

According to the invention the tubular element suitably is provided with a number of inspection holes in its tubular wall, the holes being distributed along the length of the tubular element and with suitable intervals. These holes enable an easy check or examination of the remaining amount of poison preparation inside the automatic poison dispenser. To advantage, the poison rods are made in a highly contrasting colour, red for instance, whereby generally it will be possible to decide at a long distance (possibly while using a flashlight) how far up in the tubular element there is any poison preparation.

At its top, that is, at its end where a poison rod can be inserted, the tubular element can be provided with a lockable cover or the like, whereby the automatic poison dispenser—due to its otherwise firm and stable design—without any risks may be mounted in a more open way and accessible to unauthorized people, out-of-doors for instance. Locking can be accomplished, for example, quite simply by passing a bolt laterally through opposite holes provided in the portions of said cover overlying the walls of the tubular element in a dependent way and through holes provided in said walls of the tubular element, and by providing a padlock, for instance, on the free end of said bolt.

It should be realized that the automatic poison dispenser, with or without inserted poison rods, is easy to handle, to transport and to store. If poison rods are inserted and the cover is locked, there will be very little risk of accidents in connection with transport and/or storing.

According to an essential feature of the invention, each poison rod has an end or terminal portion free of poison and of a length at least equal to the length of a poison rod end portion exposed when in the automatic poison dispenser. When inserting each poison rod in the dispenser, said end portion free of poison is caused to face upwards, thus ensuring that the last part or parts of each poison rod which possibly could fall out of the dispenser in connection with eating thereof, will be free from poison.

According to a further aspect of this invention, there is provided a preparation against rodent destructive animals, such as rats and mice, for use in an automatic poison dispenser, the preparation having the form of a solid straight rod containing poison but in one of its end portions. Advantageously, the rod contains a mixture of poisoned so-called dry bait and a stabilizing material or holder, preferably paraffin or the like. Suitably the rod contains about ⅓ of paraffin and ⅔ of dry bait.

Preferably, the dry bait is based upon one or more of the components oatmeal, wheat-flour, fish-meal, meat-meal and crushed biscuits. The poison used can be Warfarin or the stronger Crimidin or Bromadiolon.

Poison rods according to the invention will give little or no loss or waste. They do not take up moisture or attract insects. They do not get mouldy. In other words, they have long durability. They are also simple to handle and to store.

The invention will now be described more closely by exemplifying embodiments while referring to the enclosed drawings.

DESCRIPTION OF PREFERRED EMBODIMENTS

Figure 1:
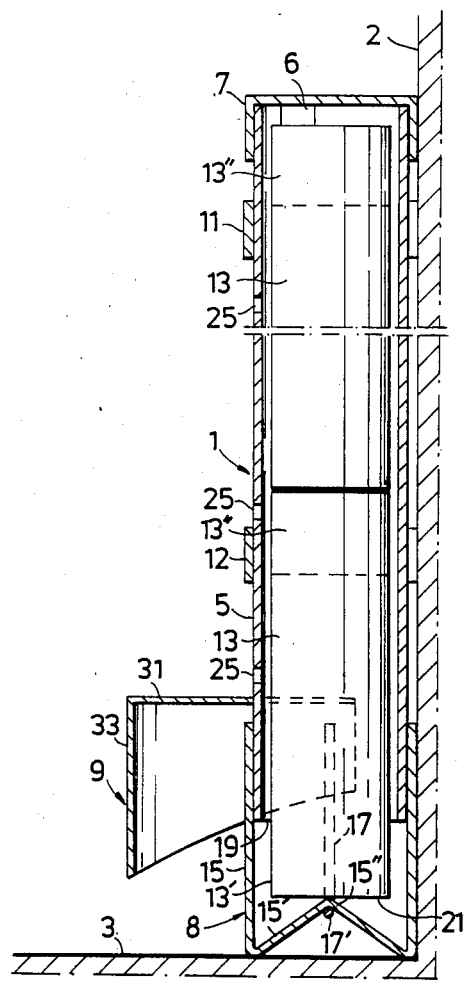
FIG. 1 is a schematic vertical center section of a first embodiment of an automatic poison dispenser in accordance with the invention, the dispenser being mounted against a wall and said section being taken perpendicularly to the wall.

The automatic poison dispenser 1 shown schematically in FIG. 1 is mounted vertically against a wall 2 and rests on a floor 3. The automatic poison dispener comprises a cylindrical tubular element 5 having a circular cross-section and provided with a cover or lid 7 at its top end, the cover closing the top opening 6 of the tubular element. At its lower end the tubular element is provided with a cage or basket device 8, as well as with a screening device 9. The cage device 8 rests on the floor 3 and the tubular element 5 is fastened to the wall 2 by means of an upper clamp 11 and a lower clamp 12 of a kind not shown in more detail. Inside the tubular element there are a number of cylindrical poison rods 13 having a circular cross-section and being stacked one upon the other. The poison rods have an outer diameter that is somewhat less than the inner diameter of the tubular element 5.

The cage device 8 consists of two wire elements 15, 17 bent essentially into U-shape and arranged in two vertical planes perpendicular to each other. The free wire element ends of the two U-elements are welded to the outside of the lower end wall of the tubular element 5. One U-element 15 has a base portion 15' bent upwards and inwards towards the tubular element 5, so that the element, in principle, has the shape of a W. The other U-element 17 has shorter vertical legs below the lower opening 19 of the tubular element. The horizontal base portion 17' of this element extends just below the upper curved top portion 15" of the base portion 15'.

The lower end surface 21 of the lowest or bottom poison rod 13 rests on said top portion 15" essentially in one point, whereby a predetermined end portion 13' of the lowest poison rod 13 will be exposed as a whole in the cage device 8, the wire elements of which are spaced such that rodents easily will have access to the end portion 13' from below and from the side. As the lowest poison rod gradually is eaten, there will be an automatic feeding of the poison rods downwards inside the tubular element 5, as long as there are still any poison rod therein. The contents of poison rods 13 can be checked through inspection holes 25 provided in the front wall of the tubular element 5, said holes being provided with regular intervals. Refill can be made quite easily from above by removing the cover 7.

The upper or top end portion 13" of each poison rod 13 (the boundary of said top end portion being indicated by means of a broken line) is free from poison and has a length at least somewhat longer than the length of the exposed end portion 13', so that no poisonous end pieces can fall down onto the floor and/or out of the dispenser in conjunction with the consuming of the last part of a poison rod by a destructive animal.

U-element 15 comprises a stop element resting on the floor 3, whereby the lower end surface 21 of the poison rod 13 will be held at a predetermined distance from the floor. This means that the screening device 9 also will be held at a predetermined distance from the floor 3, whereby well-defined access or entrance openings suitable for destructive animals will be ensured. In the position of use shown, the access or entrance openings primarily will be along the wall 2 on both sides of the automatic poison dispenser, that is, in principle when destructive animals such as rats and mice preferably move.

Screening device 9 has the form of a horizontal screen or baffle plate 31 projecting substantially from the front half of the tubular element 5 and having an essentially oval outer contour, a downwards projecting vertical screen or baffle plate 33 connecting thereto in the form of a partial cylinder surface. The height thereof decreases backwards towards the tubular element 5 and the wall 2, where there is less need for a screening effect.

Figure 2:
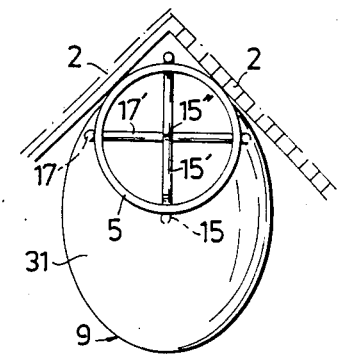
FIG. 2 is a schematic top view of the automatic poison dispenser according to FIG. 1. However, the dispenser is shown mounted in a corner between two walls. Also, to make the illustration more clear the cover and the poison rods of the automatic poison dispenser have been removed.

Also, screening device 9 having this directional effect is particularly well adapted for use in such cases where the automatic poison device is to be mounted in a wall corner, as should be clear from FIG. 2. In such a case it may, however, be necessary to adapt the height of the screen plate 33 and/or the height of the wire element 15 such that there will be enough entrance room below the plate 33, at least from the sides.

Figure 3:
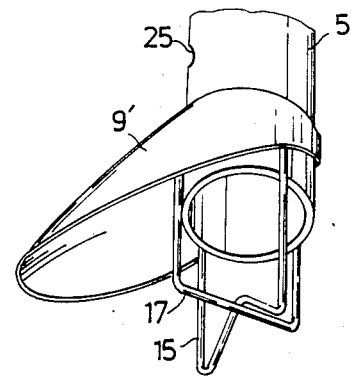
FIG. 3 is a schematic partial perspective view, taken obliquely from below of the lower part of a second embodiment of an automatic poison dispenser according to the invention.

In FIG. 3 there is shown an alternative embodiment of a screening device 9' for an automatic poison device according to the invention. In this case the screening device 9' consists of a curved screen or baffle plate which, generally speaking, projects obliquely downwards from the tubular element 5 towards one side thereof, the plate having the configuration of a cap-peak or visor. In the embodiment of FIG. 3, the two U-elements 15,17 have changed places.

Of course, the invention is not limited to the embodiments shown and described, but changes and modifications are possible within the scope of the invention as defined in the appended claims. Thus, the means for causing an end portion of a poison rod to be exposed and the screening means could of course be combined in the same means.

What is claimed is:

1. Automatic poison dispenser for rodent destructive animals, such as rats and mice, comprising:
   an at least substantially closed straight tubular element containing a poison preparation in the form of one or more solid rods axially stacked one upon the other, the rods being adapted to slide easily within the tubular element;
   the tubular element arranged, at one end, to allow the insertion of said poison rods and, at the other end, to allow an end portion only of the poison rod located at said end to be at least partially exposed when the dispenser is in a position of use;
   the poison rods arranged, when in a position of use, to be fed successively towards said other end of the tubular element due to the influence of gravitational forces;
   the tubular element, at said other end, provided with screening means arranged to prevent larger animals from accessing the exposed end portion of the poison rod, at least when the dispenser is in an essentially vertical position of use, but to allow rodent destructive animals to access the exposed end portion of the poison rod from below and/or from the side; and
   each poison rod having an end portion facing said one end of the tubular element and being free from poison and having a length at least equal to the length of an exposed end portion of a poison rod, whereby the last portion or portions of a poison rod which can possibly fall out of the dispenser in conjunction with eating will be free from poison.

2. Automatic poison dispenser according to claim 1, wherein the tubular element, at its said other end, is provided with cage-like means connected with the opening of the tubular element for allowing said end portion of a poison rod to project out of the opening of the tubular element.

3. Automatic poison dispenser according to claim 2, wherein said screening means includes a screen element projecting laterally from said other end of the tubular element and extending axially over the exposed end portion of the poison rod.

4. Automatic poison dispenser according to claim 3, wherein said screen element projects essentially on one side of the tubular element such that the tubular element can be positioned substantially close to a vertical support.

5. Automatic poison dispenser according to claim 4, wherein said screen element substantially has the shape of a visor.

6. Automatic poison dispenser according to claim 1, wherein the tubular element has a number of spaced through-holes along its length and provided in the wall of the tubular element, whereby the contents of poison rods can be readily checked from the outside.

7. Automatic poison dispenser according to claim 1, wherein the tubular element, at its said other end, is provided with projecting stop means for causing the exposed end portion of a poison rod and said screening means to be in a predetermined position relative to a base when the dispenser is in a position of use in contact with said base.

8. Automatic poison dispenser according to claim 2, wherein the tubular element has a number of spaced through-holes along its length and provided in the wall of the tubular element, whereby the contents of poison rods can be readily checked from the outside.

9. Automatic poison dispenser according to claim 4, wherein the tubular element has a number of spaced through-holes along its length and provided in the wall of the tubular element, whereby the contents of poison rods can be readily checked from the outside.

10. Automatic poison dispenser according to claim 2, wherein the tubular element, at its said other end, is provided with projecting stop means for causing the exposed end portion of a poison rod and said screening means to be in a predetermined position relative to a base when the dispenser is in a position of use in contact with said base.

11. Automatic poison dispenser according to claim 4, wherein the tubular element, at its said other end, is provided with projecting stop means for causing the exposed end portion of a poison rod and said screening means to be in a predetermined position relative to a base when the dispenser is in a position of use in contact with said base.

12. Automatic poison dispenser according to claim 7, wherein said cage-like means includes said stop means.

13. Automatic poison dispenser for rodent destructive animals, comprising:

an at least substantially closed straight tubular element containing a poison preparation in the form of one or more solids rods axially stacked one upon the other, the rods being adapted to slide easily within the tubular element;

the tubular element arranged, at one end, to allow the insertion of said poison rods and, at the other end, to allow an end portion only of the poison rod located at said other end to be at least partially exposed when the dispenser is in a position of use;

the poison rods arranged, when in a position of use, to be fed successively towards said other end of the tubular element due to the influence of gravitational forces;

the tubular element, at said other end, provided with screening means arranged to prevent larger animals from accessing the exposed end portion of the poison rod, at least when the dispenser is in an essentially vertical position of use, but to allow rodent destructive animals to access the exposed end portion of the poison rod from below and/or from the side, said screening means comprising cage-like means connected with the opening of the tubular element for allowing the exposed end portion of a poison rod to project out of the opening of the tubular element while being surrounded by said cage-like means, said screening means also comprising a screen element encompassing a circumferential portion of said tubular element, said screen element projecting laterally from said tubular element proximate said other end, said screen element extending in an axial direction over the exposed end portion of the poison rod; and means for securing the tubular element essentially vertically on a vertical wall support such that the exposed end portion is at a predetermined distance from an adjacent horizontal base, said screen element extending essentially from one side of the tubular element such that an opposite side of the tubular element can be positioned adjacent the vertical wall support, said screen element having a lower rim which is inclined downwardly as said screen element extends laterally from said tubular element, whereby said screen element provides substantially less access to said poison rod end portion from said one side than from along the vertical wall support.

14. Automatic poison dispenser according to claim 13, wherein the tubular element, at its said other end, is provided with projecting stop means, said stop means causing the exposed end portion of a poison rod and said screening means to be in a predetermined position relative to the horizontal base when the dispenser is in a position of use with said stop means in contact with said horizontal base.

15. Automatic poison dispenser according to claim 14, wherein the tubular element has a number of spaced through-holes along its length and provided in the wall of the tubular element, whereby the contents of poison rods can be readily checked from the outside.

16. Automatic poison dispenser according to claim 14, wherein said cage-like means includes said stop means.

17. Automatic poison dispenser according to claim 14, further comprising means for locking the tubular element at said one end to prevent unauthorized access to the interior of the tubular element.

18. Automatic poison dispenser according to claim 14, wherein said screening means is adapted to cooperate with adjacent portions of said vertical support and said base to give a screening effect when the dispenser is in the position of use.

19. Automatic poison dispenser according to claim 18, wherein said screen element and said cage-like means are arranged to give a labyrinth screening effect.

* * * * *